Jan. 13, 1931.  S. H. B. KIDD  1,789,261
INTERLOCKING SYSTEM
Filed June 3, 1929    2 Sheets-Sheet 1
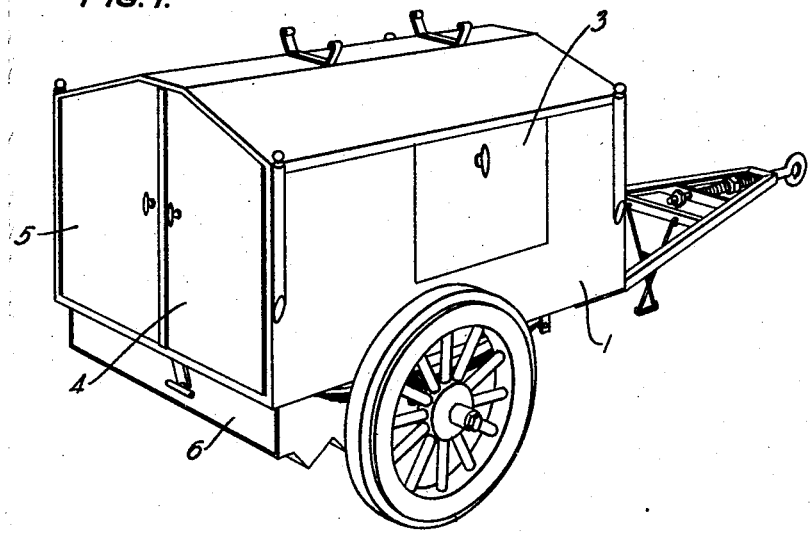
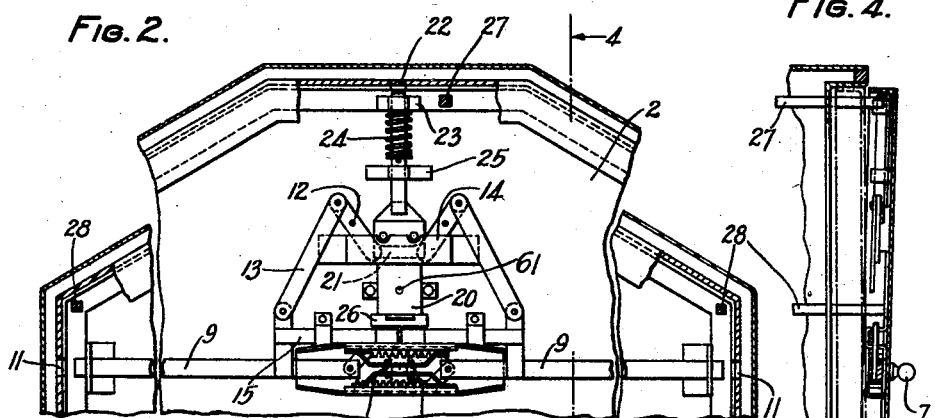
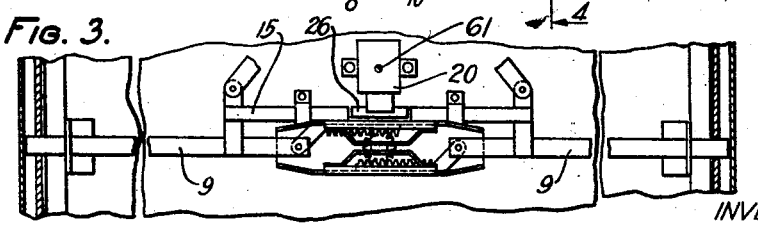
INVENTOR
S. H. B. KIDD
BY
ATTORNEY

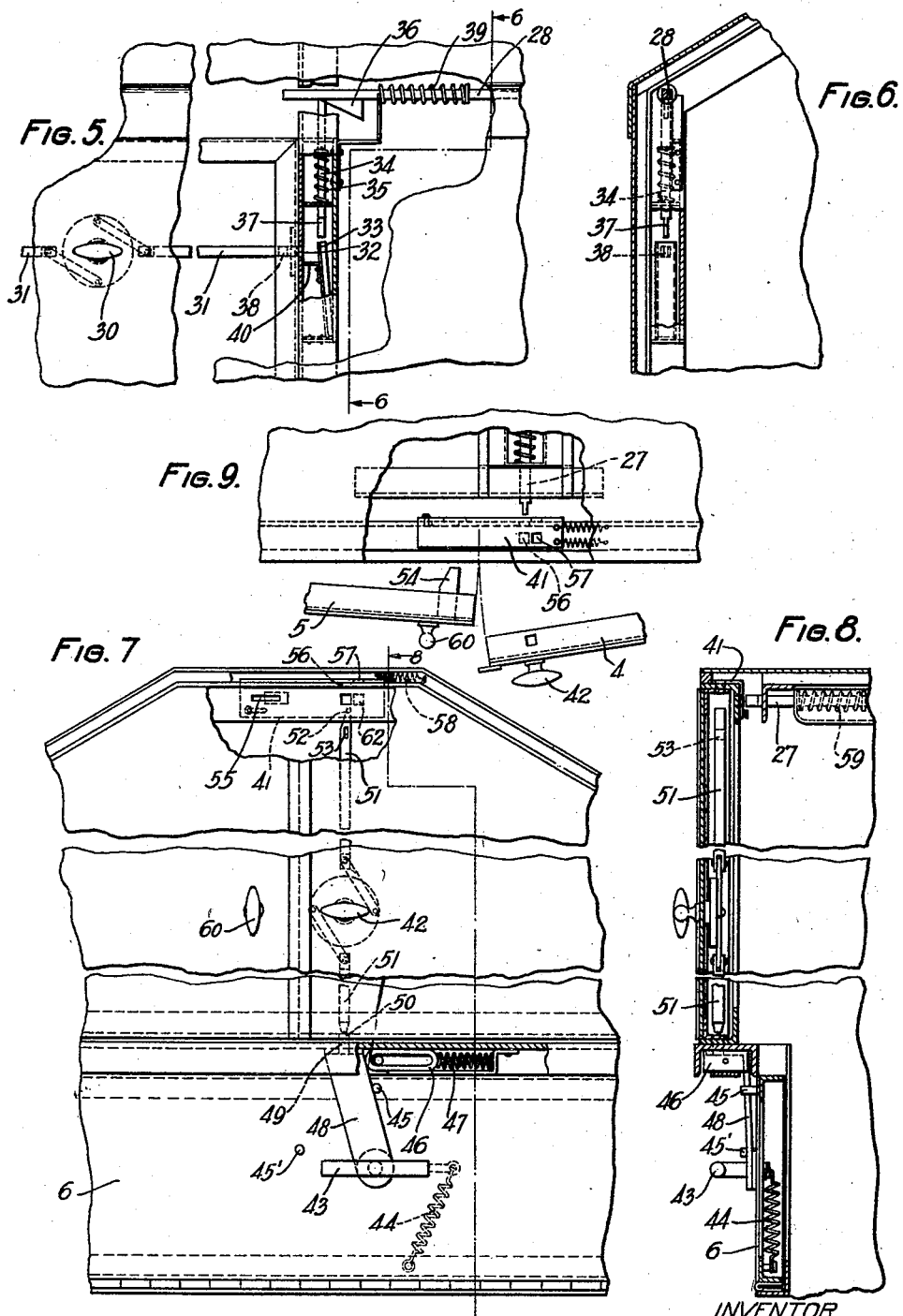

Patented Jan. 13, 1931

1,789,261

UNITED STATES PATENT OFFICE

STEPHEN H. B. KIDD, OF MONTREAL, QUEBEC, CANADA, ASSIGNOR TO WESTERN ELECTRIC COMPANY, INCORPORATED, OF NEW YORK, N. Y., A CORPORATION OF NEW YORK

INTERLOCKING SYSTEM

Application filed June 3, 1929. Serial No. 367,892.

This invention relates to locks and latches, and more particularly to a master lock and its associated latches. In many cases, where a number of closures are inter-related, it is an advantage if means be provided so that a master lock cannot be operated until every closure is fully closed and latched. Such conditions are found, by way of example, in the case of tool carts, bakers' carts, lockers in gymnasiums, filing cabinets, windows and doors of automobiles, etc.

An object of this invention is to provide latching means for a plurality of closures, so arranged that a master lock cannot be operated until all the closures are closed and the latches retaining the closures fully operated to the closed position.

For facility of description, I have shown my invention as embodied in and applied to the closures on a small vehicle suitable for carrying the equipment used in cable splicing, but it is to be understood that my invention is not restricted to the specific application illustrated.

Further objects and advantages of my invention will be apparent from the following description and from the claims appended hereto, reference being made to the accompanying drawing in which:

Fig. 1 is a view of the cable cart showing the rear and side doors.

Fig. 2 is a detailed view of the mechanism on the back of the master door in open position, partially broken away.

Fig. 3 is a view similar to Fig. 2 with the mechanism in the closed position.

Fig. 4 is a section on line 4—4 of Fig. 2.

Fig. 5 is a front view of the latch on the side door.

Fig. 6 is a section on line 6—6 of Fig. 5.

Fig. 7 is the front view of the latches on the rear doors, partially broken away.

Fig. 8 is a section on line 8—8 of Fig. 7.

Fig. 9 is a plan view, partially broken away, of the upper latching mechanism of the upper rear doors.

The cart consists of a body 1, having a door 2, completely closing the forward end of the cart. This door is employed as the master door for the cart. In each side of the cart there is a small door 3, and in the upper rear portion there is a double door 4 and 5. Immediately below the main body of the cart is a lower compartment which is closed by means of a door 6.

The master mechanism applied to the inner side of door 2 is a suitable type of latch operated by the handle 7 which is firmly fixed to a short shaft passing through the door and carrying the gear 8. Two latches 9 are slidably supported on the inside of the door and terminate at their inner ends in racks 10 meshing with the gear 8. The outer ends of latches 9 are adapted to enter suitable sockets 11 in the body of the cart and so positioned that the latches may enter them only providing the door is fully closed.

As the latches 9 are moved outwardly by the rotation of the gear 8 they actuate the levers 13 and 14. Lever 13 is pivotally connected to the slide 15 which in turn is rigidly affixed to the latch 9. The remote end of lever 13 is pivotally connected to lever 14 which is pivotally supported upon the door at 12. The free end of lever 14 is adapted to bear upon a shoulder 21 on bolt 20. The upward motion of the bolt 20 will similarly cause its upper end to engage socket 22 providing the door be fully closed. The bolt 20 carries a suitable locking device 61 accessible from the outside only when all the latches are in their latched position. The locking member 26 may then be advanced to a position between the inner ends of the slides 15 by means of the key-actuated lock 61, thus locking the master mechanism until the lock is opened.

Projecting through the body of the cart rods 28 and rod 27 are slidably mounted and so located that when either of the side doors or the rear door, respectively, are not properly latched their ends will project a distance sufficient to prevent the complete closure of main door 2. This will prevent the latches 9 and 20 from entering their respective sockets until the other doors have been fully closed.

Considering now the rods 28 which are operated by the closure of the side doors 3, the handle 30 is provided with two bolts 31 on either side thereof and controlled by the rotation of said handle. One of the bolts 31, preferably the one nearest the front main door, carries a slot 38 which is adapted to be engaged by the lower end 37 of the pin 34 under proper conditions. The end of this bolt 31 is adapted to engage a spring stop 33 resting on stop 40 in its free position and in the path of pin 34. The pin 34 is spring mounted, spring 35 tending to force it upward. The upper end of the rod is adapted to engage the rod 28 or a tapered projection 36 thereon. Spring 39 tends to keep rod 28 in its projecting and interfering position with main door 2.

Rod 27 is operated in much the same way as rod 28 but is distinguished therefrom in that it requires the closing of more than one door to render it operable. Handle 43 is rotatably mounted on lower rear door 6 and is normally forced against the stop 45 by means of the spring 44. The lever 48 is thus normally retained in its closed position even though the door 6 may be opened. A spring plate 46 is mounted below the double rear upper doors in a channel on the outside of the cart. Arm 48 at its upper end carries a horizontal portion provided with an aperture 49 adapted to receive the end of the latch for the double rear upper doors. When door 6 is fully closed arm 48 is adapted to move spring plate 46 against the pressure of spring 47 so that aperture 49 registers with the aperture 50 in the bottom of the door frame. In its normal unoperated position the spring plate will cover aperture 50.

The upper door 4 carries a rotatable handle 42 for displacing the latches 51 connected thereto upwardly and downwardly. The upper latch 51 is tapered at its upper end 52 and somewhat below the end carries a notch 53 adapted to receive the far end of rod 27. Spring plate 41 normally permits tapered end 52 to enter the aperture 62 to but a limited extent. The closing of door 5 carrying the tapered projection 54 causes the tapered projection to engage the slot 55 thereby advancing the spring plate to the left against the tension of spring 58 and causing the apertures 57 and 62 to register with aperture 56 in the body of the cart. The upper latch 51 may then be thrust through these apertures and the end of rod 27 will register with the notch 53.

The operation of this latch and locking mechanism is as follows: Completely closing door 6 causes arm 48 to move spring plate 46 to uncover aperture 50 and registers aperture 49 with 50. On closing door 5 projection 54 engages slot 55 drawing the spring plate 41 to the left and registering apertures 57, 62 and 56. Closing door 4 and rotating handle 42 locks the lower door 6 by causing the lower latch 51 to extend through apertures 49 and 50 and bolts the rear doors 4 and 5 by extending the upper latch 51 through apertures 62, 56 and 57, and registers notch 53 with the end of rod 27. Closing side door 3 and operating the handle 30 causes latch 31 to project through the aperture 32 and displace the spring 33 and registers notch 38 with rod 34. Closing the master door 2 forces rods 28 and 27 against the pressure of their respective springs 39 and 59, the far end of rod 27 engaging notch 53 thereby locking the rear doors. The rearward movement of rod 28 causes the projection 36 to force rod 34 downwardly to insert its lower end into notch 38 thereby locking the side doors. Rotating the handle 7 advances the latches 9 to engage their apertures 11 and advances bolt 20 against the pressure of spring 24 to engage the aperture 22. Lock 61 is moved into a registering position with an opening in the master door permitting the insertion of a key so that the tongue 26 may be advanced between the inner end of the slide 15 thereby locking the master door. All doors are thus locked by the single lock 61.

In the event that a side door be not locked the master door 2 may not be closed in that the rod 28 will not be capable of any rearward movement. The projection 36 will strike the rod 34 which will then bear upon spring plate 33 and allow no movement of any of the parts. In the event that lower door 6 be not fully closed spring plate 46 will cover aperture 50 and thereby lower latch 51 of the upper rear door 4 will not be able to project through apertures 50 and 49. Similarly if door 5 be not closed spring plate 41 will not be in a position to permit the upper rod 51 to enter apertures 62, 56 and 57. If rear door 4 be not closed rod 27 will strike spring plate 41 and be incapable of rearward movement thereby preventing the closure of the master door.

What is claimed is:

1. In a latching system, an enclosure with a plurality of openings, closure members for each of said openings, a master latch on one of said closure members, and latching means for each of the other closures associated with said master latch and preventing the operation of said master latch until all of such other closure members are closed and latched in a predetermined sequence of operations.

2. In a latching system an enclosure provided with a main door and with upper and lower auxiliary doors, a post between said upper and lower doors, a latch member on said upper auxiliary door, a spring controlled plate in said post for normally closing an opening therein registering with said latching member, a spring controlled lever pivotally supported on said lower auxiliary door and adapted to displace said plate and provided with an opening to receive the lower end of said latching member when said lower auxiliary door is closed, and manually operated means for moving said latching member into said opening on closing the upper door thereby latching both doors.

3. In a latching system, an enclosure provided with a main door and an auxiliary door, a latching member on each door, a spring controlled member on said enclosure and operatively associated with said doors normally preventing the closure of the main door, a projection on said member, a stop in the path of said projection, and means actuated by the latching member of said auxiliary door upon closure for rendering said stop yieldable to permit said projection to pass thereover and enable the closing of the main door.

4. In a latching system, an enclosure provided with a main door and a plurality of auxiliary doors, said auxiliary doors including an upper door and a lower door in the same plane, upper and lower latching bars on said upper auxiliary door, a first plate in said enclosure normally in the path of the upper latching bar, a second plate in said enclosure between said upper and lower auxiliary doors and normally in the path of said lower latching bar, means on said lower door for displacing said second plate when said lower door is closed, manually operated means for moving said latching bars when the upper door is closed and said second plate is displaced, the motion of said upper latching bar displacing said first plate, and a rod in said enclosure normally abutting said first plate and preventing the closure of said main door until said first plate is displaced.

5. In a latching system, an enclosure provided with an upper and lower door in the same plane, a post between said doors, a latching bar on said upper door, a spring controlled plate in said post normally in the path of said bar, a spring controlled lever pivotally supported on said lower door and provided with an opening, said lever being adapted to displace the plate to have said opening register with said latching bar on closing the lower door, and manually operated means on said upper door for moving said latching member into said opening on closing the upper door thereby latching both doors.

6. In a latching system, an enclosure provided with a plurality of co-planar doors with their axes at an angle to each other, a post rigid with said enclosure between said doors, a latching member on one of said doors, a plate in said post normally in the path of latching member, a spring controlled lever pivotally supported on the other of said doors and provided with an opening adapted to receive the end portion of the latching member, said lever being adapted to displace said plate when said other door is closed, and manually operated means on said first door for moving the latching member into said opening on closing said first door thereby latching both said doors.

7. In a latching system, an enclosure provided with a main door and an auxiliary door, a latching member on each door, a spring returned member in said enclosure operatively associated with said door for normally preventing the closure of the main door, a wedge on said member, a stop in the path of said wedge, a spring for normally holding said stop against the edge of said wedge, and manually operable means on said auxiliary door for operating its latching member when said door is closed to displace said spring whereby the spring returned member may be moved on closing the main door moving said stop into an opening in the latching member thereby locking said auxiliary door.

8. In a latching system, an enclosure provided with a main door and a plurality of auxiliary doors, said auxiliary doors including an upper door and a lower door in the same plane, upper and lower latching bars on said upper auxiliary door, the end portion of said upper latching member being tapered, a spring controlled rod in said enclosure operatively associated with said upper auxiliary door and said main door, and normally preventing the closing of the main door, a first plate in said enclosure normally in the path of said upper latching member and said rod and provided with openings to receive the ends of said member and of said rod, a second plate in said enclosure between said upper and lower auxiliary doors and normally in the path of said lower latching bar, means on said lower auxiliary door for displacing said second plate when the lower door is closed and provided with an opening to receive the lower end portion of said lower latching bar, manually operated means for moving said latching bars when the upper door is closed and said second plate displaced whereby the lower latching member enters the opening in said means on the lower auxiliary door and the upper latching member enters an opening in said first plate displacing said first plate, said spring controlled rod entering one of said openings in said first plate on closing the main door, and a means on said main door for latching and locking it thereby locking all of said auxiliary doors.

9. In a latching device, a closure member, a latching bar on said member, a second latching bar at an angle thereto also on said member and provided with a groove, a link on said first bar, a second link connected to said first link and pivoted centrally on said member with its free end resting in the groove of said second latching bar, and means for moving said first bar thereby moving said second bar.

10. In a latching system, an enclosure, a main door, an auxiliary double door, a latching member on the one of said auxiliary doors, the upper end of which is tapered, a plate on said enclosure provided with a plurality of openings, a spring controlled rod normally abutting said plate and preventing the closure of said main door, a tapered projection on the other auxiliary door and adapted on closing of said door to move said plate partially out of the path of said latching member, means for moving said latching member and completely displacing said plate so that an opening therein registers with the end of said rod permitting of the closure of the main door, and a means for latching said main door thereby locking said auxiliary doors.

In witness whereof, I hereunto subscribe my name this 27th day of May, 1929.

STEPHEN H. B. KIDD.